United States Patent [19]

Hegedus et al.

[11] Patent Number: 4,706,851
[45] Date of Patent: Nov. 17, 1987

[54] DISPENSER FOR BIRD FOOD

[75] Inventors: Leslie J. Hegedus, London; Simon W. Bentall, St. Albans, both of England

[73] Assignee: Mehmet Nazim Adil, Girne Mersin, Turkey

[21] Appl. No.: 767,200

[22] PCT Filed: Dec. 18, 1984

[86] PCT No.: PCT/GB84/00437
§ 371 Date: Aug. 13, 1985
§ 102(e) Date: Aug. 13, 1985

[87] PCT Pub. No.: WO85/02753
PCT Pub. Date: Jul. 4, 1985

[30] Foreign Application Priority Data

Dec. 20, 1983 [GB] United Kingdom ............... 8333909

[51] Int. Cl.4 ........................................... B65D 33/36
[52] U.S. Cl. ................................... 222/106; 222/181; 222/185; 222/460; 222/567; 119/51 R; 119/52 R; 383/67; 383/15; 383/906; 403/344; 312/257 SM; 248/100
[58] Field of Search ............... 222/185, 181, 180, 107, 222/106, 105, 460, 461, 478, 567, 173, 80; 119/51 R, 52 R; 383/67, 15, 906; 403/344; 312/257 SM, 264, 108; 248/101, 99, 100

[56] References Cited

U.S. PATENT DOCUMENTS

| 1,091,392 | 3/1914 | Schlichtinger | 119/52 R |
| 3,176,879 | 4/1965 | Mojonnier | 222/173 X |
| 3,190,511 | 6/1965 | Daly | 222/478 |
| 4,023,871 | 5/1977 | Dantzler | 312/108 |
| 4,166,708 | 9/1979 | Lafferty, Sr. | 403/344 X |
| 4,440,317 | 4/1984 | Clark et al. | 222/103 |

FOREIGN PATENT DOCUMENTS

| 3149939 | 6/1983 | Fed. Rep. of Germany . |
| 252572 | 6/1926 | United Kingdom . |
| 948716 | 2/1964 | United Kingdom . |
| 957964 | 5/1964 | United Kingdom . |
| 989929 | 4/1965 | United Kingdom . |

Primary Examiner—Joseph J. Rolla
Assistant Examiner—David H. Bollinger
Attorney, Agent, or Firm—Cushman, Darby & Cushman

[57] ABSTRACT

A bird food dispenser comprises two inter-fitting housing parts (1) which hold between the bottom of a bag (40) containing food, the parts (11) defining an inlet for receiving food from a hole in the bottom of the bag. Each part (11) has an arrowhead portion (31) which passes through the bottom of the bag and is then received by an opening (32) in the other part. Food may be dispensed from apertures (18) with adjacent perch members (20, 21) or from trays (62, 74).

6 Claims, 10 Drawing Figures

U.S. Patent  Nov. 17, 1987  Sheet 1 of 2  4,706,851
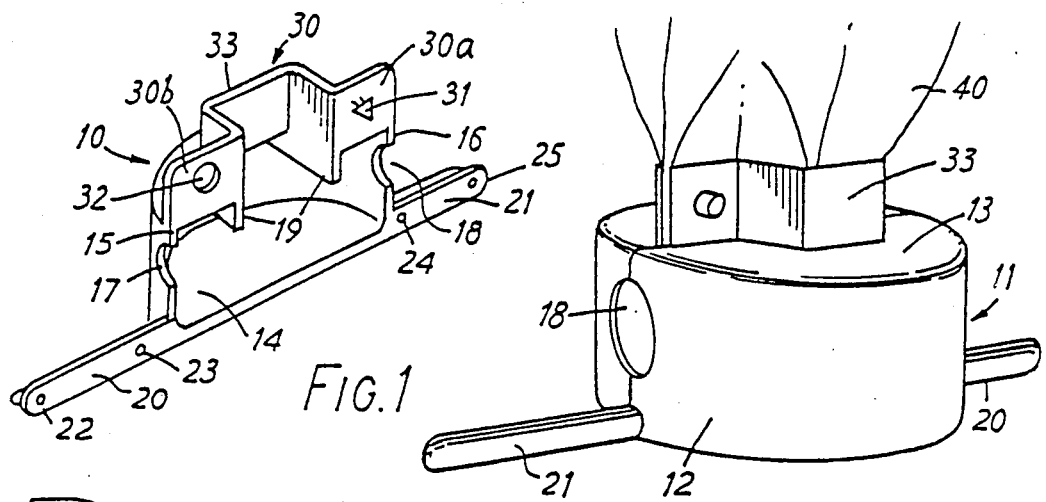
FIG.1
FIG.2
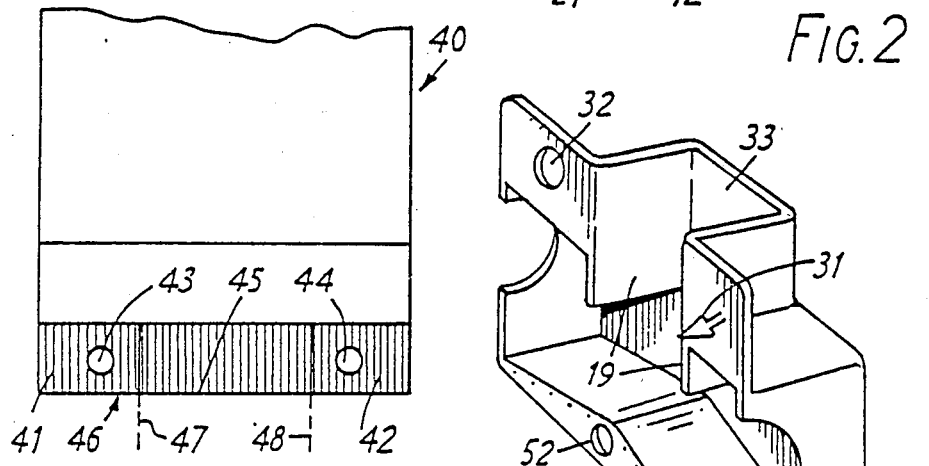
FIG.3
FIG.4
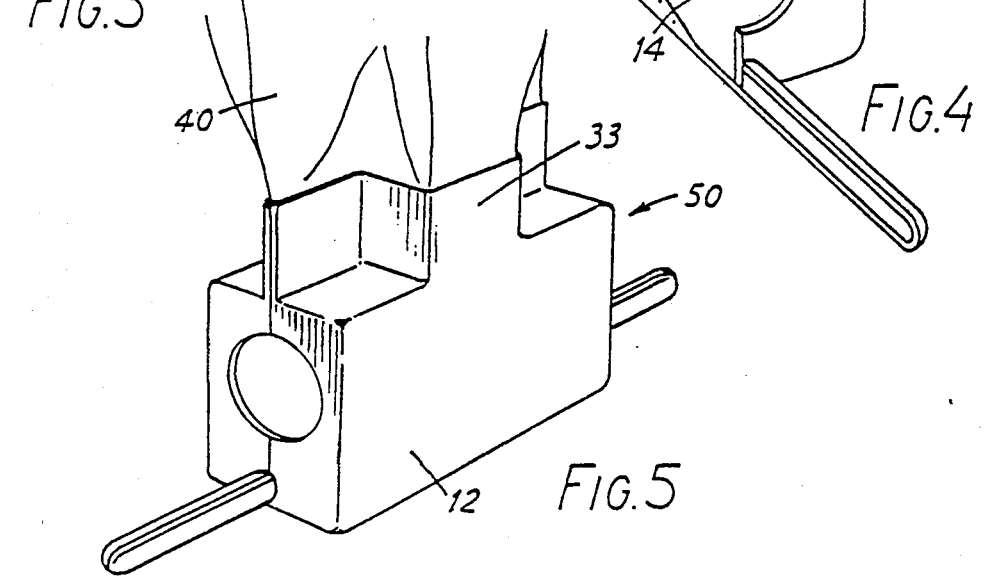
FIG.5

DISPENSER FOR BIRD FOOD

TECHNICAL FIELD

The present invention relates to a dispenser for bird food and more particularly to a device which can be attached to a bag or other package in which bird food is sold to convert it into a bird feeder.

BACKGROUND ART

With most packages in which bird food is sold, it is necessary to pour the contents into a separate dispenser in order to feed the birds. Such dispensers are relatively expensive articles and the pouring of bird food can be time consuming. Furthermore the bird food can be spilt during pouring, which is wasteful and messy.

Some existing bird food packages can also serve as a food dispenser, but they suffer from various disadvantages, e.g. not sufficiently weatherproof, relatively large amount of material required, difficulty of manufacture due to large number of individual components, and the time-consuming task of converting the package into its dispensing configuration.

DE No. 3149939 A1 discloses a bird feeder with a bag containing bird food and a dispensing arrangement comprising a cup containing bird food in the bottom of the bag and a separate external trough with hooks for securing it to the cup. Since the cup is inside the bag, the arrangement is not readily reusable as it is necessary to insert the cup into the bag before the bird food. Thus either the manufacturer would insert the cup or a customer would insert the cup into an empty bag before filling the bag with food. In the former case a new cup would be needed for each bag of food; the latter case would be time consuming and spillage of the food would be likely.

DISCLOSURE OF INVENTION

The present invention seeks to overcome or reduce one or more of the disadvantages mentioned in the preceding paragraphs.

According to a first aspect of the present invention there is provided a dispenser having an upper aperture for receiving from a container material to be dispensed and at least one lower aperture for dispensing the material therefrom, the dispenser comprising two inter-fitting members, characterised in that the inter-fitting members define between them the upper aperture and have attachment means which are arranged to secure the two members to each other and to the container.

An advantage of the above dispenser is that it permits material to be directly dispensed from a container in which the material is sold, thus avoiding spillage. The dispenser is readily reusable and can be used with successive containers of material. All that is necessary is to disconnect the attachment means from an old container and attach them to a new container. The dispenser does not need to be large since the container holds the bulk of the material to be dispensed.

According to a second aspect of the present invention there is provided an arrangement for dispensing a flowing medium comprising a container for the medium and a dispenser having an inlet and an outlet and being located at the bottom of the container with its inlet in communication therewith, the dispenser comprising two inter fitting members, characterised in that the inter-fitting members define between them the dispenser inlet and have attachment means which secure the two members to each other and to the container.

In a preferred arrangement, the attachment means comprise projections and co-operating means for receiving the projections, the projections passing through a wall portion of the container and then engaging the co-operating means.

The container is preferably a bag, and the walls of the bag are preferably sealed together where the projections pass therethrough. The sealed walls preferably form skirt portions which may be initially provided with holes or may have holes produced therein by the projections.

BRIEF DESCRIPTION OF THE DRAWINGS

Preferred embodiments of the present invention will now be described, by way of example only, with reference to the accompanying drawings, of which:

FIG. 1 shows a perspective view of a member constituting one half of the dispenser of a first embodiment of the present invention;

FIG. 2 shows a perspective view of a dispenser formed by two halves as shown in FIG. 1, together with a bag;

FIG. 3 shows a bag for use with the embodiment of FIGS. 1 and 2;

FIG. 4 shows a perspective view of a member constituting one half of the dispenser of a second embodiment of the present invention;

FIG. 5 shows a perspective view of a dispenser formed by two halves as shown in FIG. 4, together with a bag;

MODES FOR CARRYING OUT THE INVENTION

Figure 6:
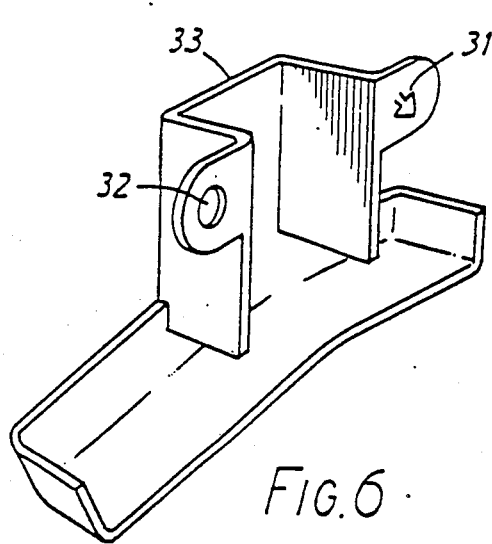
FIG. 6 shows a perspective view of a member constituting one half of the dispenser of a third embodiment of the present invention.

Referring now to the drawings, FIG. 1 shows a member 10 of plastics material which is arranged to fit with an identical member to form a dispenser for bird food.

The member has a housing part 11, FIG. 2, comprising an annular wall 12 with a semi-circular top 13 and a semi-circular base 14. The edges 15, 16 of the wall 12 have semi-circular recesses 17, 18. Internal baffle means, for example a cowl 19, is provided above each feeding aperture 17, 18 to restrict the flow of food and prevent spillage whilst permitting access to the food by birds. Perch members 20, 21 having studs 22, 23 and recesses 24 and 25 extend from the exterior of wall 12 below the recesses 17, 18. Each perch member constitutes half a perch (divided longitudinally) so that when two members 10 are fitted together the studs 22, 23 on each enter the recesses 24, 25 on the other. Thus two complete perches are formed.

From the top 13 of the housing part 11 extends a flange 30 having an arrowhead projection 31 on portion 30a and an aperture 32 on portion 30b. A central portion 33 of flange 30 is shaped so as to form a passage with the portion 33 of an identical member. The relative sizes of arrowhead projection 31 and aperture 32 are such that the former will enter and then be retained by the latter.

FIG. 3 shows the bottom of a bag 40 for use with a dispenser comprising two members 10. The bag is of a thin plastics material such as polyethylene. At the base of the bag the walls are sealed together to form a skirt portion 46. To release the contents of the bag 40, e.g. bird food, the skirt 46 is formed so that it is relatively easy to open the portion 45 between dotted lines 47, 48 without tearing the rest of the bag. The skirt portions 41 and 42 remaining at the sides are of the same size and shape as the flange portions 30a, 30b. Apertures 43, 44 of a similar size to aperture 32, are provided through the skirt portions 41, 42.

In use, the bag 40 containing bird food is inverted with the base uppermost and centre skirt portion 45 is pulled or cut open to produce a generally tubular passage between skirt portions 41, 42. Two members 10 are then placed together with perch members uppermost such that the tubular passage is located in the passage formed by portions 33. The arrowheads 31 of the members 10 are then passed through apertures 43, 44 and then through respective apertures 32. Thus the bag is secured to the dispenser and the halves of the dispenser are secured to each other. At the same time studs 22, 23 enter recesses 24, 25 to accurately locate the members 10 and to further assist in securing them together. Recesses 17 and 18 of the two members are then in alignment to form circular apertures.

The bag and dispenser are then re-inverted so that the dispenser is at the bottom. Bird food in the bag falls into the dispenser and the arrangement is then ready for use; birds resting on the perches can obtain food through the apertures above them.

The above-described arrangement has several advantages. It permits bird food to be directly dispensed from a bag in which the bird food is sold. This avoids spillage of the bird food since no transfer to a separate container is necessary. The dispenser is weatherproof and can, if desired, be used with successive bags of bird food. Alternatively, since it is relatively cheap to manufacture, a dispenser may be sold together with each bag of food. The cheapness of the dispenser is due to the following factors:

(i) The dispenser can be small since it does not need to store all the bird food to be dispensed. Since it is located at the bottom of a bag acting as a reservoir the dispenser only needs to house a small amount of food at any one time. When food has been eaten it is replaced by food falling under gravity from the bag.

(ii) The dispenser only requires one mould for its manufacture since the two halves are identical. In addition there are no moving parts. Moreover fitting the two halves together can be left to the customer which further reduces manufacturing costs.

One or more of the following modifications may be made to the above-described arrangement.

Interengaging studs and recesses may be provided on the edges 15, 16 of the annular wall and/or on the straight edge of base 14 instead of, or as well as, on perch members 20, 21.

Instead of members 10 each having two perch halves, they may each have one whole perch and this may be located at an edge 15 or 16 (like members 20, 21) or at another part of the annular wall (e.g. at a position midway around the wall so that the perch would be perpendicular to perch members 20, 21). The above features may be combined so that the complete dispenser has four perches. In further modifications, one, three or more than four perches, or even no perches at all may be provided. In the last alternative, it is preferable if the exterior surface of the wall 12 is shaped (e.g. with horizontal ridges or bars) to permit small birds (e.g. tits) to hold on to the dispenser. In all cases suitably-positioned feeding apertures 17, 18 are provided.

In a preferred modification the perches are pivotable. This has the advantage of compactness for transport. In addition the perches may be arranged to completely block the feeding apertures 17, 18 when they are in their folded-in disposition. The option of closing the apertures when desired is advantageous, e.g. in inclement weather, or when a cat is near, or when it is desired to move the dispenser and avoid spillage of the food.

The two members 10 forming the dispenser may be hinged together, preferably along their bottom edge. The cowl 19 may be omitted.

Although, as stated above, it is preferable that the members 10 are identical, this is not essential. For example one part of the dispenser can have two arrowheads 31 and the other part two apertures 32. Alternatively, or in addition, each perch member can have one stud and one recess.

With regard to the bag 40 the skirt portion 46 may be cut all the way along, instead of just along centre portion 46. In this case it is closed again in the region of the side skirt portions by the flange portions 30a, 30b of the dispenser. The relatively large skirt portions 41,42 are not essential and the walls of the bag may only be sealed together in the immediate vicinity of holes 43, 44. Holes 43, 44 do not need to be produced during manufacture of the bag; they can be made during assembly of the dispenser by being punched by arrowheads 31.

Indeed a standard polythene bag may be used because the flange portions 30a, 30b hold the walls of the bag together to prevent escape of food through the produced holes 43, 44. When assembling the dispenser, the bag should be sufficiently empty that the parts of the walls to be located between the flange portions 30a, 30b can be pressed closely against each other without food preventing this.

Referring now to FIGS. 4 and 5, there is shown a second embodiment of the invention which uses a bag as shown in FIG. 3. The dispenser 50 is generally the same as that of the previous embodiment except that housing part 11 is generally rectangular with wall 12 flush with the wall of flange portion 33. An advantage of this is that, during manufacture, ejection of the dispenser halves from a mould is easier because the internal walls 19 constituting the internal cowls are shorter than in the previous embodiment. An optional attachment means 52 is provided at the edge of the base 14.

Figure 7:
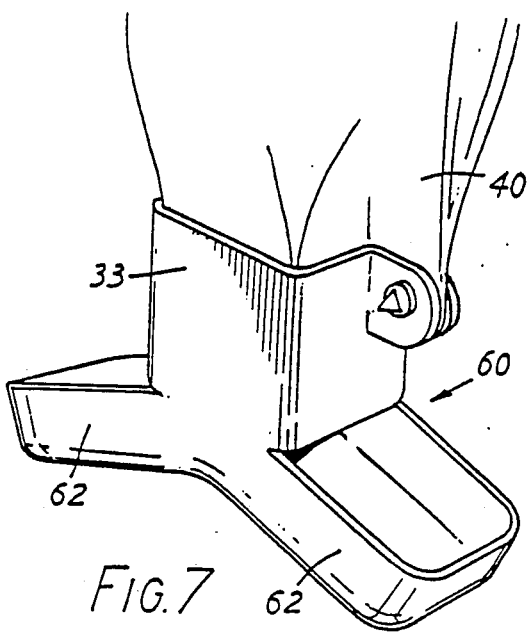
FIG. 7 shows a perspective view of a dispenser formed by two halves as shown in FIG. 6, together with a bag.

FIGS. 6 and 7 show a third embodiment of the invention which also uses a bag 40 as shown in FIG. 3. Instead of perches 20, the dispenser 60 has trays 62 for receiving the contents of the bag. The trays may be provided with perches (not shown).

Figure 8:
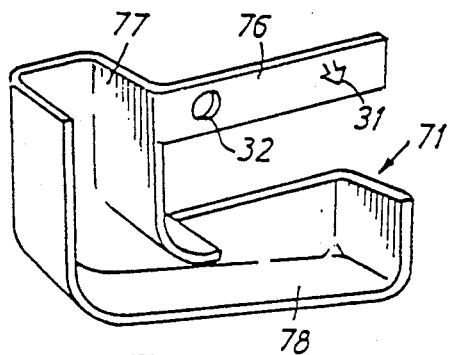
FIG. 8 shows a perspective view of a member constituting one half of the dispenser of a fourth embodiment of the present invention.
Figure 9:
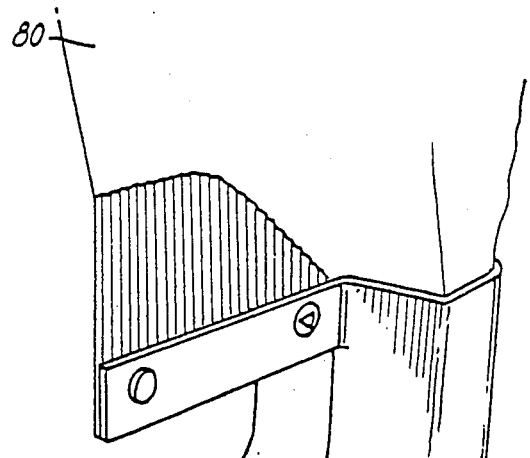
FIG. 9 shows a perspective view of a dispenser formed by two halves as shown in FIG. 8, together with a bag.
Figure 10:
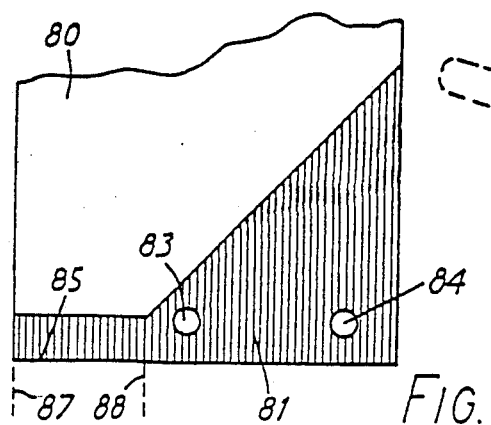
FIG. 10 shows a bag for use with the embodiment of FIGS. 8 and 9.

FIGS. 8 and 9 show a fourth embodiment of the invention for use with a modified bag 80 as shown in FIG. 10. In this embodiment, the two halves 71, 72 of the dispenser 70 are not identical, but are substantially mirror images of each other with the possible exception of the attachment means. Half 71 comprises an arm 76 having attachment means in the form of an aperture 32 and an arrowhead projection 31. Arm 76 is attached to a portion 77 forming, with the corresponding portion of half 72, a passage for receiving the contents of bag 80. The portion 77 leads into portion 78 constituting half of the tray 74. A perch 79, indicated in dotted lines in FIG. 9, may also be provided.

The walls at the bottom of bag 80 are sealed together to form a skirt portion 81, 85. Apertures 83, 84 are formed through the skirt portion 81. In use the bag is inverted and the skirt portion is cut open, at least between dotted lines 87 and 88. The halves 71 and 72 are then assembled, with the projections 31 passing through a respective aperture 83, 84 and then the corresponding aperture 32.

In all the above embodiments, the arrangement is conveniently suspended by means of a hole through an upper skirt portion (not shown) of the bag.

The passages formed by portions 33, 77 for receiving the contents of the bag may be of any convenient shape. In particular they may taper downwardly, e.g frusto-conical. The various features of the above-described embodiments may be selected in any appropriate combination.

It is envisaged that the dispensers could be used to dispense a variety of products, e.g. salt or even fluids from a variety of containers, e.g. bags, sachets, boxes, packets etc. In the case of fluids, it would be preferable to provide means for controlling the supply of the fluid from the lower apertures. In the case of boxes and packets of usual shape flanges 30 would be set back from edges 15, 16 by an amount corresponding to half the width of the box or packet.

In addition the length of the shaft of each arrowhead 31 would be increased by an amount corresponding to said width. Alternatively specially-shaped boxes or packets with skirt portions 41, 42 could be used.

It is also envisaged that means other than arrowheads 31 and apertures 32 could be used to secure the members 10 to each other and to the container. For example both halves of the dispenser may have attachment means in the form of apertures, and separate pin elements may pass therethrough to secure the arrangement together. Alternatively one or more straps around the entire arrangement could be used.

What is claimed is:

1. An arrangement for dispensing a flowing medium comprising a container for the medium and a dispenser having an inlet and an outlet and being located at the bottom of said container, said inlet being in communication with the bottom of said container, wherein said dispenser comprises two members, said members defining between them said dispenser inlet and being secured to each other and to said container by attachment means, said attachment means comprising projections and co-operating means receiving the projections, and said container comprises one or more wall portions said projections passing through one or more of said wall portions of said container before they are received by said co-operating means.

2. A dispenser according to claim 1, wherein said members are identical.

3. A dispenser according to claim 1, wherein the members have perch portions.

4. A dispenser according to claim 1, wherein the members have tray portions.

5. An arrangement according to claim 1, wherein the container is a bag.

6. An arrangement according to claim 5 wherein said wall portions of said bag are sealed together where said projections pass therethrough.

* * * * *